July 21, 1959   E. W. GRANT   2,896,057
TEMPERATURE CONTROL DEVICE
Filed Oct. 29, 1956

INVENTOR.
EARL W. GRANT
BY
*Philip Subkow*
ATTORNEY

United States Patent Office 2,896,057
Patented July 21, 1959

2,896,057

TEMPERATURE CONTROL DEVICE

Earl W. Grant, Los Angeles, Calif., assignor to Statham Instruments, Inc., Los Angeles, Calif., a corporation of California Application October 29, 1956, Serial No. 618,962

7 Claims. (Cl. 219—20)

My temperature control device consists of an electrical bridge circuit in which is placed electrical resistance elements which are not temperature sensitive, a chamber, and a temperature sensitive element which is also present in the bridge. The bridge is adjusted so that it is balanced when the desired temperature is present in the space. Any variation in temperature changes the resistance balance of the bridge. The bridge is unbalanced in one direction when the temperature falls below the chosen temperature. When the temperature rises above the chosen temperature the bridge is unbalanced in the opposite direction. Means are provided whereby the current flows to the heating element when the bridge is unbalanced because of fall of temperature and shuts off when the desired temperature is reached and remains shut off at all times when the temperature is above the chosen temperature.

In a preferred embodiment the bridge feeds a magnetic amplifier. The magnetic amplifier feeds the heater windings. When the bridge is balanced no current flows through the heater windings, and when the bridge is unbalanced by a drop in temperature, electrical valve means in the form of half wave rectifiers permit flow of current to and from the amplifier to the resistance element, which heats the jacket. When the temperature rises above the chosen temperature the bridge is unbalanced in the opposite direction and the bridge polarity is opposite to that when the bridge is unbalanced at the temperature below the chosen temperature. The rectifiers do not permit current to flow to and from the magnetic amplifier.

These and other objects of my invention will appear from the further description taken together with the drawings, of which:

Figure 1:
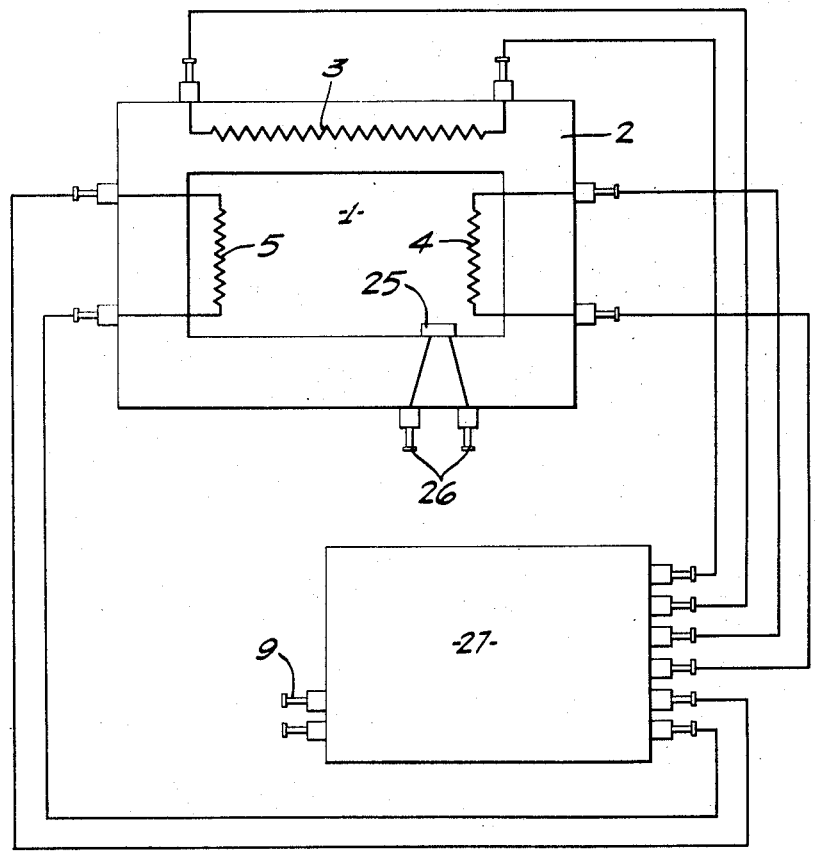
Fig. 1 is a partially schematic arrangement showing one application of my temperature control device.

The heater element 3 is placed in the electrically insulating wall 2, e.g., a molded plastic wall of the heating space 1. The temperature sensitive resistances 4 and 5 are placed in the heating space so that they may sense the temperature in the chamber 1 and have their electrical resistance varied with change in temperature. A thermometric element, such as a thermocouple 25 or other temperature measuring device may be positioned in the space with electrical leads 26 usually used in thermocouple systems.

Figure 2:
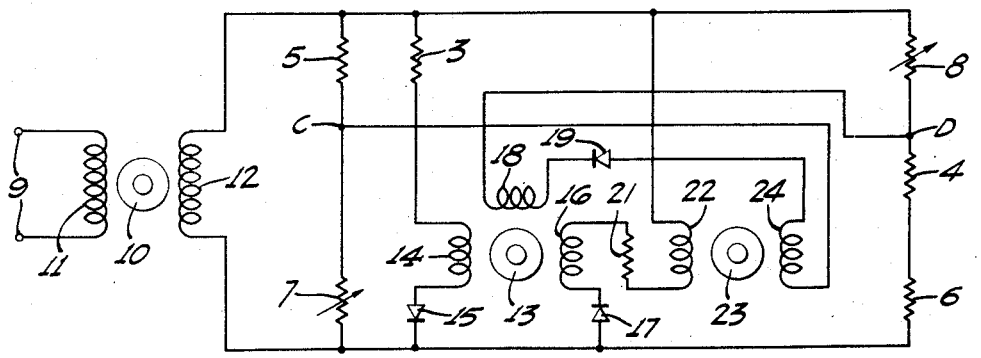
Fig. 2 is a wiring diagram of my temperature control device.

The remaining elements of the control circuit are conveniently placed in an enclosure 27. The control circuit (Fig. 2), all elements of which, other than resistances 3, 4 and 5, are enclosed in the box 27, is composed of a bridge composed of variable resistance elements 7 and 8 and fixed resistance elements 5, 4 and 6. The resistance elements 7 and 8 are temperature insensitive, i.e., do not change substantially with temperature. Resistance element 6 however is preferably temperature sensitive so that it is resistance changes as the ambient temperature of the enclosure 27 changes due to temperature variations, to compensate for changes in impedance with temperature, as will be more fully explained below.

The amplifier supply voltage is obtained from a toroid wound ring transformer composed of a ring core 10 and an input toroid winding 11 connected to an A.C. supply at 9, for example, 115 volts A.C., and output toroid coil 12 which reduces the voltage, for example to 35 volts.

Control reactors 13 and 23 of the reset magnetic amplifier are iron ring reactors with toroid load winding 14 and reset winding 16, and load winding 22 and reset winding 24, respectively. Reactor 23 is the input stage and reactor 13 is the output stage of the magnetic amplifier. Reactor 13 also carries a feed-back winding 18 inductively coupled with the core or reactor 13 for magnification of the gain of the amplifier. Winding 18 is connected to the control coil 24 through a half-wave rectifier 19. The output or load coil 14 is connected to the input to bridge through half-wave rectifiers 15 and the heater element 3. The half-wave rectifier 17 is connected in series with the control coil 16, resistance 21 and load coil 22 across the input to the bridge. Thus, the oppositely polarized rectifiers 15 and 17 are conductive on part of a half-wave. The above system acts as a reset magnetic amplifier in which the saturation of the coils 13 and 23 established by current flow through coils 14 and 22 is modified by the reset coils 16 and 24 when the reset potential is exerted across 24 and across 16, as described below.

The control reactors 13 and 23 are of similar construction, 13 being larger than 23, both are saturable, and both having rectangular hysteresis loops. Such toroid coil wound ring reactors are well known in the art and need not be further identified, as will be clear to those skilled in this art.

In operation, the adjustment of the variable resistances 7 and 8 brings the bridge to a balance within the space 1, and therefore, with the fixed resistances 4 and 5 at the chosen temperature as reported by thermocouple 25. The temperature of the bridge balance is thus controllable by the adjustment of the variable resistances 7 and 8.

With the bridge in balance no current flows to the input windings 24 of the input stage 23, points C and D being at the same potential. With no current flow in 24, the ring core 23 is in saturated condition by current through 22 from the supply source 12 through the half wave rectifier 17. Coil 22 will have a minimum impedance, causing a large current flow in the control winding 16, thus causing an unsaturation in the ring 13, raising the impedance of the load or output coil 14 and causing a minimum and preferably no current flow through 3. Thus the reactor 23 controls the control winding 16 of reactor 13 through the control coil 24 of the input reactor. When the temperature drops the bridge unbalances to raise the potential at point C to be greater than point D. Current now flows through 24, 19 and 18. The saturation of 23 decreases causing a decreased current flow through 22, 21, 16 and 17, and an increase in saturation of 13, and a decrease in the impedance of 14, permitting current through 3 to increase in value to maintain saturation of the coil 13, or if the condition of no current had previously existed permitting current now to flow through 3.

When temperature is re-established the bridge is now in balance and the potential at C and D are equal and no current flows through 24.

When temperature is re-established and the bridge is again in balance, no current flows through heater resistance 3.

A rise in temperature above the balance temperature unbalances the bridge in the opposite direction to that of the bridge unbalance when temperature falls below the balance temperature. Point D is then at a higher potential than point C but no current will flow through the coil 24, since it is blocked by the half-wave rectifier 19 which is polarized against flow of current in that direction. No current thus flows through 3 so long as the temperature is above the balance temperature.

With the bridge balanced at the desired temperature and no current flowing to the resistance 3, a change in temperature in the control box 27 will have an effect on the electro-magnetic characteristics of the circuit in box 27 similar to a change in temperature in the same direction in the space 1. The temperature sensitive winding 6, responding to this change in temperature in box 27, will cause a bridge unbalance in a direction and magnitude to compensate for the change in the electro-magnetic characteristics of the system in the control box, so that no current will flow to the resistance element 3 so long as the temperature in box 1 is at the chosen level irrespective of the changes in temperature in the box 27.

While I have described a particular embodiment of my invention for the purpose of illustration, it should be understood that various modifications and adaptations thereof may be made within the spirit of the invention as set forth in the appended claims.

I claim:

1. In combination, an electrical resistance heater element, a temperature-controlling circuit associated with said electrical resistance heater element, comprising an electrical bridge circuit including a temperature-sensitive electrical resistance element, variable resistance elements for balancing said bridge, means for connecting an alternating power source to the input of said bridge, a reset magnetic amplifier, a pair of saturable magnetic cores, a pair of windings on each core, one of said windings of one of said cores connected in series through said half-wave rectifier to a heater resistance to be controlled, the other of said windings of said one core connected across said power source in series with a half-wave rectifier, and one of said windings of said other core, the other winding of said other coil connected to the output of said bridge through a half-wave rectifier.

2. In the circuit of claim 1 a feedback coil inductively coupled with said first named core in series with said last named rectifier.

3. An electrical circuit for controlling an electrical resistance heater which comprises a temperature-sensitive resistance element and a variable resistance substantially insensitive to temperature, means for connecting said temperature-sensitive resistance and said variable resistance in an electrical bridge circuit, means for connecting an alternating current power source to the input of said bridge, a pair of saturable core reactors, each including a load coil and a control coil, the control coil of one of said reactors connected through a half-wave rectifier across the output of said bridge, the load coil of said reactor connected in series with the control coil of the second of said reactors and in series with a half-wave rectifier across the input connection to said bridge, the load coil of said second named reactor connected in series with said heater resistance and with a third half-wave rectifier across the input connection to said bridge.

4. In the circuit of claim 3, a feedback coil in series with the coil and rectifier connected across the output of said bridge, said feedback coil being inductively coupled with the other of said reactor coils.

5. A temperature control device comprising a chamber, an electrical resistance heater in said chamber, a temperature-sensitive resistance element in said chamber, a balancing resistance, means for connecting said temperature-sensitive resistance and said balancing resistance in a bridge circuit, means for connecting an alternating current power source to the input of said bridge, a pair of saturable core reactors, each including a load coil and a control coil, the control coil of one of said reactors connected through a half-wave rectifier across the output of said bridge, the load coil of said reactor connected in series with the control coil of the second of said reactors and connected in series with a half-wave rectifier across the input connection to said bridge, the load coil of said second named reactor connected in series with said heater resistance and with a third half-wave rectifier across the input connection to said bridge.

6. In the device of claim 5, a feedback coil in series with said first mentioned half-wave rectifier and inductively coupled with the core of said second named reactor.

7. In combination, an electrical resistance heater element, a control circuit for said heater element, said control circuit comprising a reset magnetic amplifier including a reset control coil and a load coil connected to an A.C. source and to said heater resistance through a half-wave rectifier in series with said heater resistance and said load coil, an electrical bridge comprising a temperature sensitive resistance and a balancing resistance, an A.C. power source connected to the input of said bridge, the output of said bridge connected to the said reset control coil of said magnetic amplifier.

References Cited in the file of this patent
UNITED STATES PATENTS

| | | |
|---|---|---|
| 2,259,711 | Stevens et al. | Oct. 21, 1941 |
| 2,632,885 | Barclay | Mar. 24, 1953 |
| 2,706,764 | Mitchell | Apr. 19, 1955 |
| 2,706,765 | Lengvenis | Apr. 19, 1955 |
| 2,767,296 | Welch | Oct. 16, 1956 |
| 2,809,241 | Weissman | Oct. 8, 1957 |

OTHER REFERENCES

Ogle: General Electric Review, vol. 53, No. 10, October 1950, pages 41–46.